United States Patent [19]
Farrington et al.

[11] Patent Number: 5,391,976
[45] Date of Patent: Feb. 21, 1995

[54] POWER FACTOR CONTROL ARRANGEMENT FOR AN OLS BASED ON QUARTER CYCLE AVERAGED POWER FLOW

[75] Inventors: Richard W. Farrington, Mesquite; Mark E. Jacobs, Dallas; William P. Wilkinson, Rockwall, all of Tex.

[73] Assignee: AT&T Corp., Murray Hill, N.J.

[21] Appl. No.: 98,183

[22] Filed: Jul. 28, 1993

[51] Int. Cl.⁶ .......................... G05F 1/70; H02M 1/14
[52] U.S. Cl. ....................................... 323/207; 363/45
[58] Field of Search ........................... 363/45, 46, 124; 323/207, 222

[56] References Cited

U.S. PATENT DOCUMENTS

| | | |
|---|---|---|
| 4,222,096 | 9/1980 | Capewell . |
| 4,412,277 | 10/1983 | Mitchell . |
| 4,677,366 | 6/1987 | Wilkinson et al. . |
| 4,825,351 | 4/1989 | Uesugi ..................... 363/79 |
| 4,974,141 | 11/1990 | Severinsky et al. .............. 363/81 |
| 5,006,975 | 4/1991 | Neufeld ..................... 363/80 |
| 5,019,952 | 5/1991 | Smolenski et al. .............. 363/16 |

FOREIGN PATENT DOCUMENTS

474471A2  3/1992 European Pat. Off. .

OTHER PUBLICATIONS

"Power Factor Correction with the UC3854," Unitrode Application Note, C. de S. e Silva, 1991.
"High Power Factor Preregulators for Off-Line Power Supplies," Unitrode.
"Switching Regulator Power Supply Design Seminar Manual," Lloyd Dixon, Paper 12, 1991.
"High Power Factor Switching Preregulator Design Optimization," Unitrode Switching Regulator Power Supply Design Seminar Manual, Lloyd Dixon, Paper 13, 1991.
"Fast Controllers for High Power Factor AC-DC Converters," Proceedings of IEEE, Stankovic, Verghese, Liu, Thottuvelil, Firenze, 1991.
"A Digital Controller for a Unity Power Factor Controller," Workshop on Computers in Power Electronics, Mitwalli, Leeb, Verghese, Thottuvelil, Berkeley, Calif., Aug., 1992.
"Linear System Theory and Design," C. T. Chen, 1984, pp. 354 to 365.
"High Speed Control of Sinusoidal Input Current Converters for Minimal Energy Storage Requirements", B. Carsten, PCIM, Sep. 1987, pp. 196-303.
"Optimum Input and Output Filters for a Single-Phase Rectifier Power Supply," S. B. Dewan, IEEE Tr. Ind. App., vol. 1A-17, No. 3 May/Jun., 1981, pp. 282-208.
"Kalman Filter Based High Speed Measurement and Control of AC Voltages for UPS Application," Sivakumar, S., Nataram, K. pp. 907-912.

Primary Examiner—Steven L. Stephan
Assistant Examiner—Robert Nappi
Attorney, Agent, or Firm—Alfred G. Steinmetz

[57] ABSTRACT

A power factor control system for a rectifier is operative through the generation of estimators of control input parameters (a peak squared input AC voltage $E_m^2$ and load power) and by the use of these substantially ripple free signals controls a boost, buck, buck-boost, SEPIC or other related type converter at the input to the rectifier. The generation of these parameters allows the derivation of a programmed current $i_p$ used to control the wave form of the actual input current. The control procedure is based on a quarter cycle averaged power basis. The input power is derived from the rms values of the input voltage and current. Given the output power and its deviations in power due to load changes, the programmed current $i_p$ is determined by deriving an input conductance of the rectifier and combining it with the input voltage.

9 Claims, 8 Drawing Sheets

POWER FACTOR CONTROL ARRANGEMENT FOR AN OLS BASED ON QUARTER CYCLE AVERAGED POWER FLOW

FIELD OF THE INVENTION

This invention relates to power factor control at the input to a power circuit powered off of an AC power line.

BACKGROUND OF THE INVENTION

Control of power factor at the input of a power circuit, powered off of an AC power line typically designated as an off line switcher (OLS), is critical to both the integrity of the AC power line as well as the efficient operation and transient response of the power circuit itself. In theory the power factor can attain a unity value by forcing the input current waveform to conform exactly to a sinusoidal waveform in phase with the fundamental of the sinusoidal voltage waveform input. Many techniques have been advanced to achieve this current waveform control. Some of the earlier techniques use passive networks with reactive components to shape the input current waveform. As power factor and other operating requirements of the power supply become more demanding the trend has been toward the use of active power factor control networks to control the input current waveform.

Active power factor control networks typically sense input and output signal parameters of the power circuit and utilize a rectifier followed by a boost, buck, buck-boost, SEPIC or similar power trains connected between the AC line and the power circuit to enhance the power factor. The boost power train includes a power switch selectively switched or pulse width modulated in response to these signal parameters to force the input current to conform to a desired or programmed current waveform. In a particular illustrative arrangement disclosed in U.S. Pat. No. 4,412,277 a rectified input AC voltage waveform is multiplied with an error voltage representing the deviation of the output voltage from a regulated value. The resulting control signal is scaled to provide a programmed AC current waveform $i_p$. This waveform is used to control the modulation of a pulse driving the power switch of the boost power train to provide the desired input current waveform and hence advance the power factor value more closely to a unity value.

An improved power factor control arrangement disclosed in U.S. Pat. No. 4,677,366 uses an instantaneous rms value of the input AC voltage as a control variable to provide a suitable transient response to changes in the amplitude of the waveform of the AC line voltage. This control arrangement includes a feed-forward control, added to accommodate rapid changes occurring in the rms value of the input AC voltage. This feed-forward arrangement scales the programmed current $i_p$ inversely by the square of the rms input voltage.

A problem with these existing arrangements is the effects of ripple voltage due to rectification and other causes superimposed on the sensed voltage waveforms. This ripple voltage in the sensed signals is a spurious signal which is superimposed on the error voltages used to control the boost converter. This prevents an accurate determination of the waveform of the programmed current $i_p$, and creates undesirable side effects in the operation of the control circuitry. Present techniques advanced to deal with this ripple voltage slow the response time of the power factor control circuitry.

Another problem with existing arrangements to enhance power factor is the slow response time of output voltage regulation control loops to output load transients. Existing arrangements to address this problem include output power as a feed-forward variable in the feed-forward control loop controlling the power switch of the power train. A key variable in the effect of the output power on the control process is the energy stored in the output capacitor of the power train.

A controller designed to accurately accommodate changes in output power has been implemented as a digital controller and is disclosed in the disclosure entitled "A Digital Controller for a Unity Power Factor Controller" Mitwalli et al, Workshop on Computers in Power Electronics, Berkley, Calif., August, 1992. This controller is based on modeling instantaneous power flows and is based on knowledge of the value of the power train's output capacitance. It additionally requires complex real time calculations to achieve satisfactory operation.

SUMMARY OF THE INVENTION

A power factor control system for an off line switching power supply (OLS) is operative through the generation of substantially ripple-free estimates of control input parameters (a squared peak input voltage $E_m^2$, output voltage and load power) and by the use of these substantially ripple-free signals controls a boost, buck, buck-boost, SEPIC (Single Ended Primary Inductor Converter) or other OLS type converter to enhance power factor at the input to the OLS. The generation of these parameters allows the derivation of a programmed current $i_p$ used to control the waveform of the actual input current. The control procedure is based on a quarter cycle averaged power basis that takes advantage of the energy stored in the output capacitor of the converter which is significant compared with the amount of energy that is drawn from the AC line during a quarter cycle of the AC voltage waveform.

The input power to the OLS is derived from the rms values of the input voltage and current on a quarter cycle time scale. Given the output power and its deviations in power due to load changes and error in the desired output voltage, the programmed current $i_p$ is determined by deriving an input conductance of the OLS and combining it with the input voltage.

DETAILED DESCRIPTION

Figure 1:
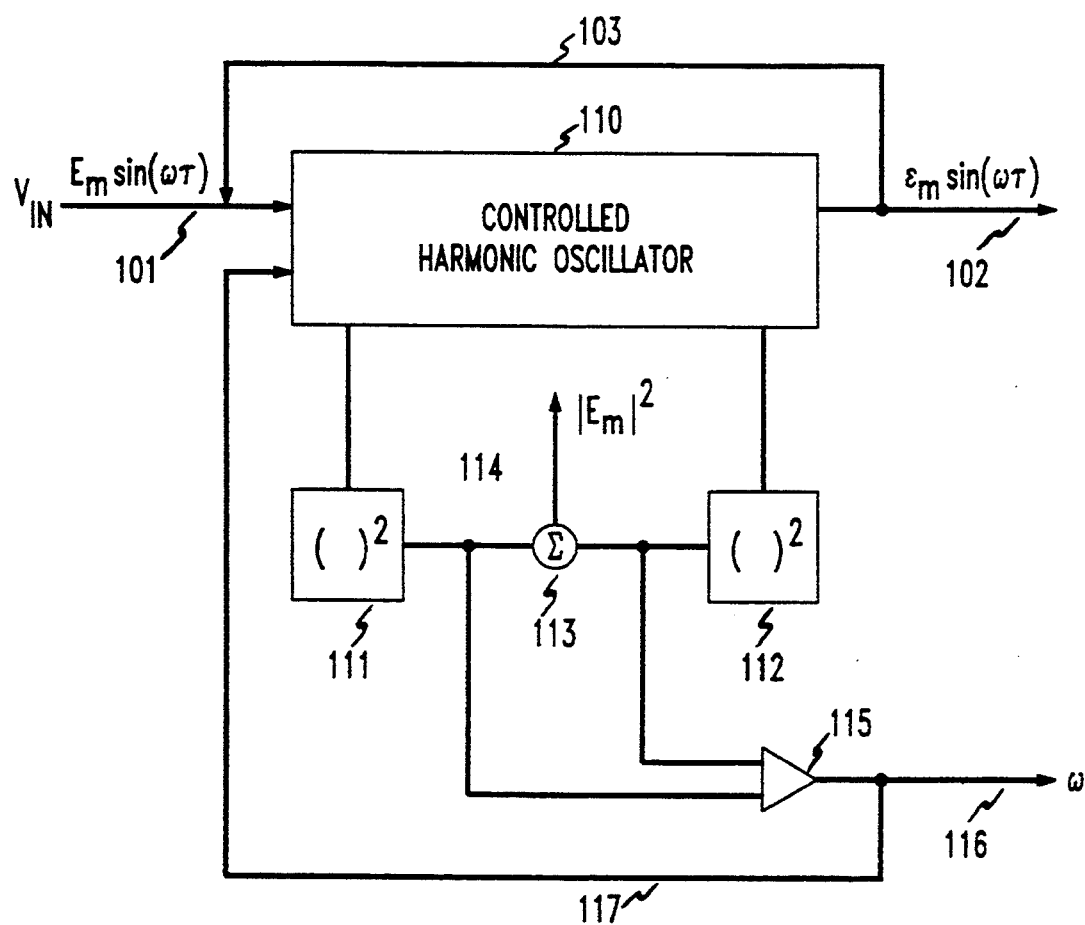
FIG. 1 is a schematic of a ripple-free $E_m^2$ estimating circuit forming part of the invention.

An estimating circuit for determining specified input parameters to the rectifier of a power factor enhanced power system, as shown in the FIG. 1, takes the input AC voltage and extracts values representing the square of its peak, and the in-phase time varying value of the fundamental. The input AC voltage $E_m \sin(\omega t)$ is directly applied to the input terminal 101 of a controlled harmonic oscillator 110. The controlled harmonic oscillator 110 responds to the input AC voltage on lead 101 and generates an AC sinusoidal voltage $\epsilon_m \sin(\omega t)$ on its output lead 102. The controlled harmonic oscillator 110 may comprise any circuitry comprising integrators connected to generate both a sinusoidal fundamental of the input AC voltage both in phase with it and a component displaced from it by $\pi/2$.

The two derived signals displaced in phase by $\pi/2$ are coupled respectively to the signal squaring circuits 111 and 112. The outputs of the squaring circuits 111 and 112 are summed in the summing circuit 113 to produce the peak square value $E_m^2$ on lead 114. The form of the summed output signal is a ripple-free magnitude governed in accord with the equation:

$$\cos^2(\theta) + \sin^2(\theta) = 1$$

where $\theta$ is any value determined by the circuitry.

The outputs of the two squaring circuits 111 and 112 are also coupled to an operational amplifier 115 which, by controlling the integrator gains, derives a value for the frequency $\omega$ of the fundamental at lead 116.

A detailed description of an estimator suitable for application here is disclosed in our co-pending patent application Ser. No. 08/083,747, filed Jun. 25, 1993.

Figure 2:
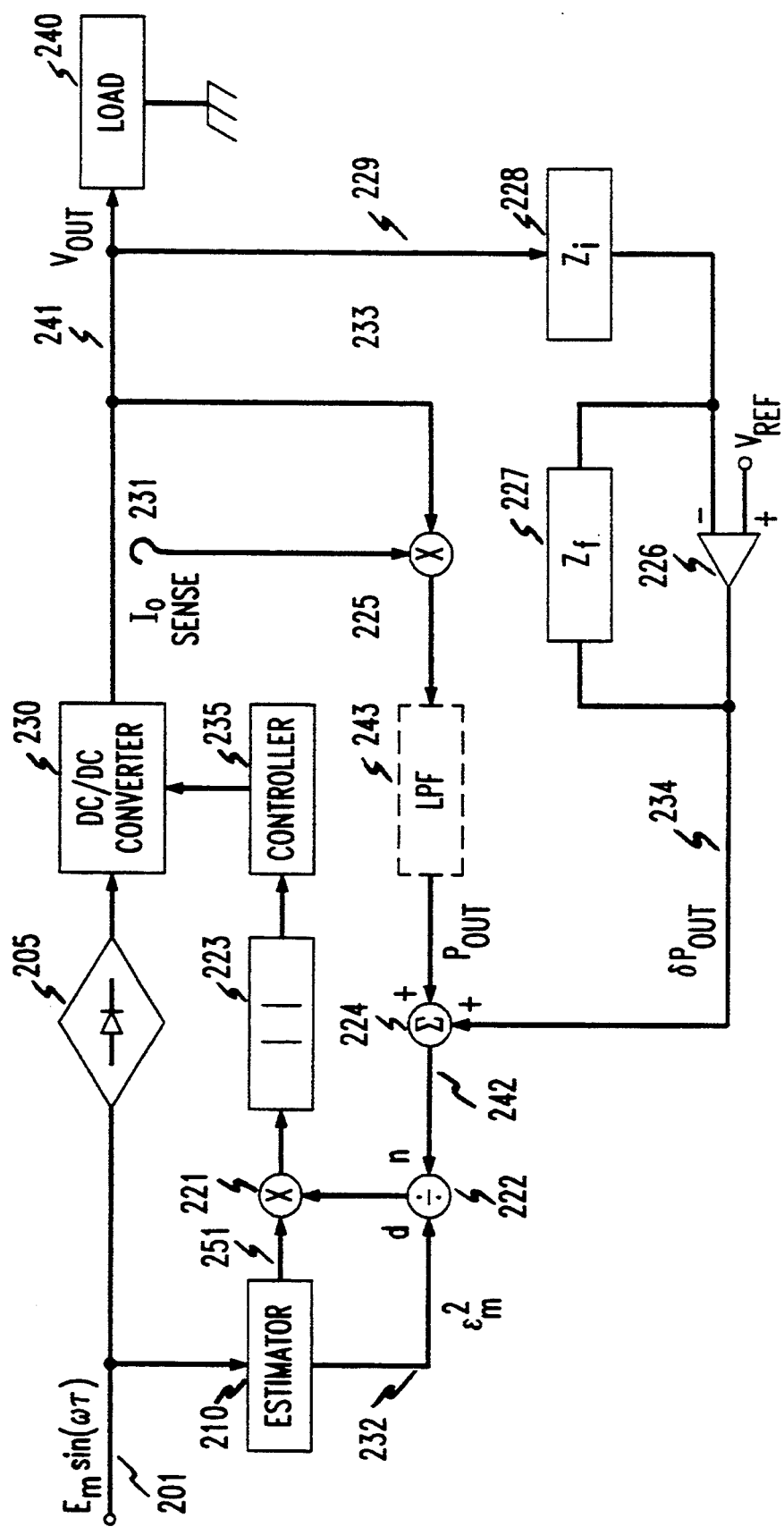
FIG. 2 is a schematic of a power system with enhanced power factor according to the principles of the invention.

A power processing system, shown in FIG. 2 includes a power factor control system to enhance power factor at the input of an off line switching circuit shown schematically as a rectifier followed by a boost converter. The AC line supplying the voltage $E_m \sin(\omega t)$ is connected to the input lead 201 which in turn applies this voltage to a full-wave rectifier 205 and to an estimator 210, such as is shown in FIG. 1.

The output of the rectifier 205, as schematically shown in the FIG. 2, is coupled to a switching type converter 230, such as a boost, buck or buck-boost type converter, whose power switch is pulse width modulated to generate a programmed current whose waveform corresponds to the AC voltage waveform input at lead 201. The power switch is controlled by the controller 235 which responds to the programmed current parameters supplied by the estimator 210. Controller 235 may be embodied as an IC circuit which responds to the programmed current $i_p$ to produce a pulse width modulated drive signal for driving the converter's power switch to achieve intended power factor and regulation results. IC circuits to respond to an input signal such as $i_p$ are available commercially.

The estimator 210 supplies the parameter $\epsilon_m \sin(\omega t)$ on lead 251 and the parameter $E_m^2$ on lead 232. Additional parameters are fed back in response to signals sensed at the circuit output, mainly the output voltage on output lead 241, sensed by lead 229 and the output current $I_{load}$ sensed by the current sensor 231 on lead 241.

The sensed output current $I_{load}$ is multiplied with the output voltage $V_{out}$ sensed on lead 233 in the multiplier 225 and the resulting product representing the output power of the DC-to-DC converter 230 is applied to the summing circuit 224. The output voltage sensed on lead 229 is applied to the gain control impedances 227 and 228 and the inverting input of the operational amplifier 226. A reference voltage is applied to its non-inverting input of the operational amplifier 226. Its output on lead 234 is representative of an error in the output power, $\delta P_{out}$, of the converter. This value $\delta P_{out}$ is applied to the summing circuit 224.

The signal on lead 242 (i.e. the output of summing circuit 224) is applied to the numerator input of a dividing circuit 222. The peak square voltage value $E_m^2$ on lead 232 is applied to the denominator input of the dividing circuit 222.

The output of the dividing circuit 222 is combined with the $E_m \sin(\omega t)$ output, on lead 251, of the estimator 210 in the multiplier 221. The output of the multiplier is scaled by scaling circuit 223 to form its absolute magnitude and applied to the controller 235. The output of the rectifier 205 is directly connected to the controller 235 via lead 215.

The operation of the circuit in FIG. 2 can be understood by discussing the theoretical basis underlying its operation. The underlying principle is the equating of the average input power to the rectifier 205 to the instantaneous output power from the rectifier 205, in combination with an accounting for the imperfect efficiency $\eta$ of the power conversion process (i.e., efficiency is less than 100%).

$$\eta \cdot P_{in,avg} = P_{out} \qquad (1)$$

$$\eta \cdot E_{rms} I_{rms} = P_{out} \qquad (2)$$

Satisfying the equation (2) requires that the power factor be unity at the input to the rectifier. The time interval for the averaging process for both Equation (1) and Equation (2) is any positive integer multiple of a quarter cycle of the input AC sinusoidal waveform. The imprecision in equating average and instantaneous power in Equations 1 and 2 is accommodated by the energy stored in the output capacitor of the OLS.

A control law for the programmed current $i_p$, corresponding to Equation (2) may be formulated. This control law, which is based on a quarter-cycle averaged basis, is:

$$i_p = \frac{2(P_{out}) E_m \sin(\omega t)}{\eta \cdot E_m^2} \qquad (3)$$

This uses the following relationship for sinusoidal waveforms:

$$E_m^2 = 2 \cdot E_{rms}^2 \qquad (4)$$

For practical converters of the boost or similar type for high power factor applications, $\eta$ is about 0.93 to 0.98, and is relatively constant under substantial variations in load power.

Thus Equation 3 allows the development of a control strategy to compute the programmed current $i_p$ based on knowledge of the rms value of the input voltage and the output power, or a filtered value of the output power.

A controlled conductance value G for the rectifier is defined such that the instantaneous value of the programmed current $i_p$ is given by:

$$i_p = G \cdot e_{in} \tag{5}$$

where the value G is:

$$G = \frac{2 \cdot P_{out}}{\eta \cdot E_m^2} \tag{6}$$

and where $e_{in}$ is the instantaneous value of the input voltage, or, preferably, the instantaneous value of the fundamental harmonic $\epsilon \sin(\omega t)$ of the input voltage. For a sinusoidal input voltage and for constant load power, G is constant and $i_p$ is sinusoidal. In addition, the determination of G is "well conditioned", i.e., it does not require division of small uncertain numbers by other small uncertain numbers. In practice, Equation (3) or, equivalently, Equation (5) is not sufficient for a complete control process because it is almost always required that the output voltage from the power supply be regulated to a predetermined voltage such as 400 volts. Accordingly, Equation (3) is modified to include a "power increment" $\delta P_{out}$ to reflect the error between the desired (or reference) output voltage $V_{ref}$ and the actual output voltage, $V_{out}$.

$$i_p = 2 \frac{(P_{out} + \delta P_{out}) \cdot E_m \sin(\omega t)}{\eta \cdot E_m^2} \tag{7}$$

The purpose of Equation (7) is to use the output power $P_{out}$ to control the principal portion of the controlled conductance G, and to use $\delta P_{out}$ as a small increment to regulate the output voltage. Thus, the OLS can have the capability to respond quickly to large step changes in output power, with the feedback term $\delta P_{out}$ only accounting for modeling errors.

Specific design is required for the signal processing elements that provide the inputs for the determination of the controlled conductance G. First, the estimate of the peak-squared voltage or equivalently, the rms-squared value of the AC input voltage should be substantially ripple free and should respond quickly to changes in amplitude of the waveform of the AC input voltage. The preferred method as well as other alternatives for determining the peak-squared value of the AC input voltage are described in our co-pending parent application Ser. No. 08/083,747, filed Jun. 25, 1993.

Second, the estimate of output power should also be substantially ripple free during steady-state operation, and it too should respond quickly to changes in the load. The preferred approach for loads that draw constant power in the steady state is to multiply the rectifier output voltage by the output current. Commercially available analog ICs such as the MC1495 or AD532 can be used. An alternative is to rely on the pre-regulated, known value of the rectifier output voltage (i.e. the reference voltage applied to the operational amplifier 226 in FIG. 2) and to scale the measured OLS output current to estimate the output power, (i.e. the current sensing circuit 231 in FIG. 2) with filtering supplied, as necessary, to reduce ripple. Ripple contributes to unwanted periodic variations in the derived value G that can cause distortion of the programmed current $i_p$.

Third, the feedback term $\delta P_{out}$ should also be substantially ripple free. Filtering, to eliminate the ripple, is required. The filtering selected must be consistent with stability requirements of the feedback loop in which it is embedded. This filter may be embodied in circuitry using the same observer technique described in our co-pending application referenced hereinabove. Such a design is also used in the estimator 210 which estimates the rms value of the input AC waveform. This low pass filter using observer techniques estimates a dc (i.e. ripple free) component of the output voltage or output current. A two state variable model of the 100 or 120 Hz ripple can be used to estimate the ripple, which is then subtracted from the output voltage or output current.

Figure 3:
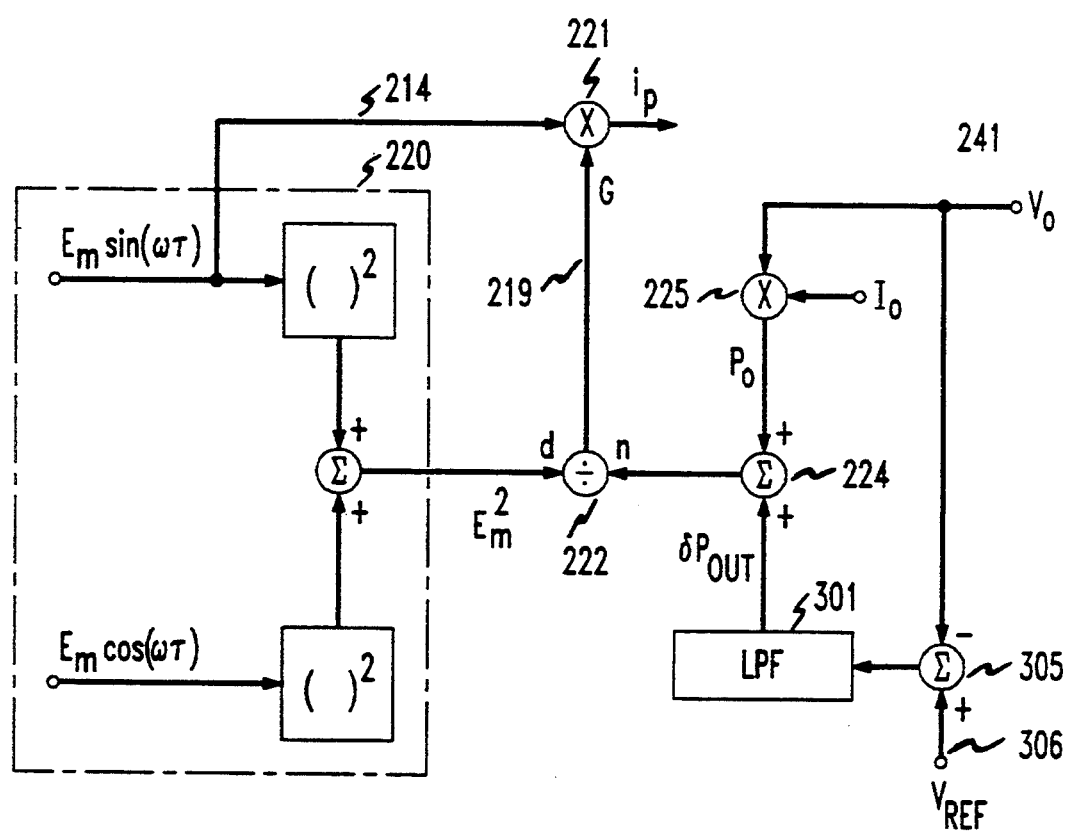
FIG. 3 is a signal flow diagram for describing a control process of the power system of FIG. 2 with enhanced power factor.

FIG. 3 shows the signal flow control, required for the controller 235 and supplied as shown by the output portion of the estimator of FIG. 1, for a control process described by Equation (7). The output voltage is sensed at output lead 241 and summed in summer 305 with a reference voltage applied to lead 306. The summed output is applied to the low pass filter 301. Filter 301 is a low-pass filter for sensing output voltage error and includes the required gain and phase shaping networks necessary to assure system feedback stability. The detailed required characteristics of the LPF 301 are readily apparent to persons skilled in the art.

The output of filter 301 is representative of error in output voltage at lead 241. The required output power change (i.e. required by the voltage change) denoted $\delta P_{out}$ is applied to a summer 224. The estimated steady state power is derived by multiplying the output voltage and the output current in the multiplier 225. The estimated steady state power is summed with the $\delta P_{out}$ by the summer 224. If gain and phase control of the output of multiplier 225 is desired an optional low pass filter 243 may be inserted between the multiplier 225 and the summer 224, as shown in the FIG. 2.

The output of summer 224 is applied to the numerator input "n" of the divider 222. The peak squared voltage $E_m^2$ output of the estimator 220 is applied to the denominator input "d" of the divider 222. The resultant of the division is the required OLS conductance "G" and is supplied on the lead 219 and designated as the value "G".

In the FIG. 3 the value of $E_m \sin(\omega t)$ on lead 214 is applied to the multiplier 221 whose other input is the value "G". The multiplier combines the two inputs to derive the programmed current value $i_p$.

Figure 4:
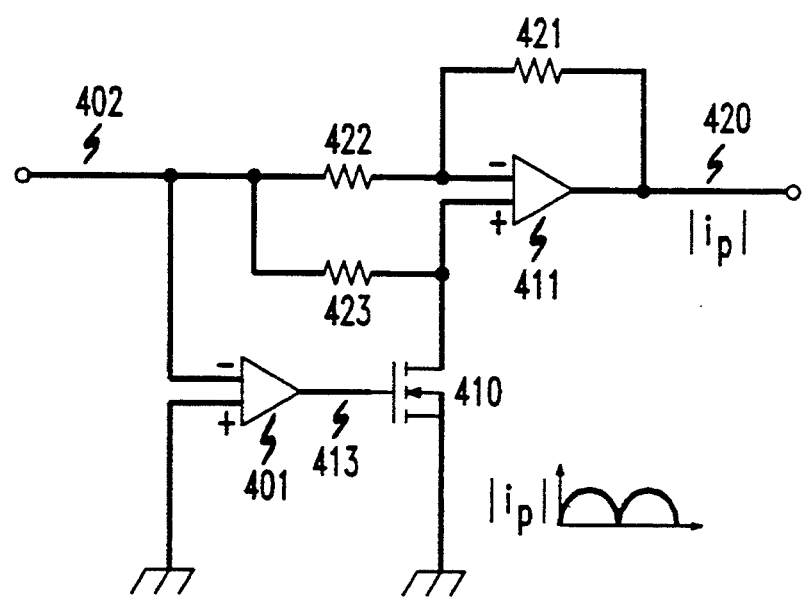
FIG. 4 is a schematic of a circuit for determining the absolute magnitude of a voltage.

As a further practical consideration, it is necessary that the absolute magnitude of the programmed current be supplied to the controller if the input voltage to the boost or similar type switching regulator is already rectified by a diode bridge. This function is provided by the scaling circuit 223 shown in the FIG. 2. This circuitry to derive the absolute magnitude value can be implemented by an operational amplifier and comparator as shown in FIG. 4. This circuitry includes the operational amplifier 401 having its inverting input 402 connected to receive the $i_p$ output of the multiplier 215 shown in the FIG. 3. This value of $i_p$ is also applied to the inverting input port of an operational amplifier 411. Its non-inverting input is connected to an FET device 410 whose control electrode 413 is controlled by the output of the operational amplifier 401. The FET device 410, whose conductance is switched with the sign of the amplitude of $i_p$ on lead 402, connects the non-inverting input of amplifier 411 to ground. Thus the conductance of FET 410 is switched depending on whether operational amplifier 401 is saturated positive or negative, in determining whether operational amplifier 411 is inverting or non-inverting. Resistors 421 and 422 are equal, suitable values being about 10K ohms. The resistance of resistor 423 should be about 500 times larger than the on-resistance of FET 410. The output of lead 420 represents the absolute magnitude of $i_p$.

Figure 5:
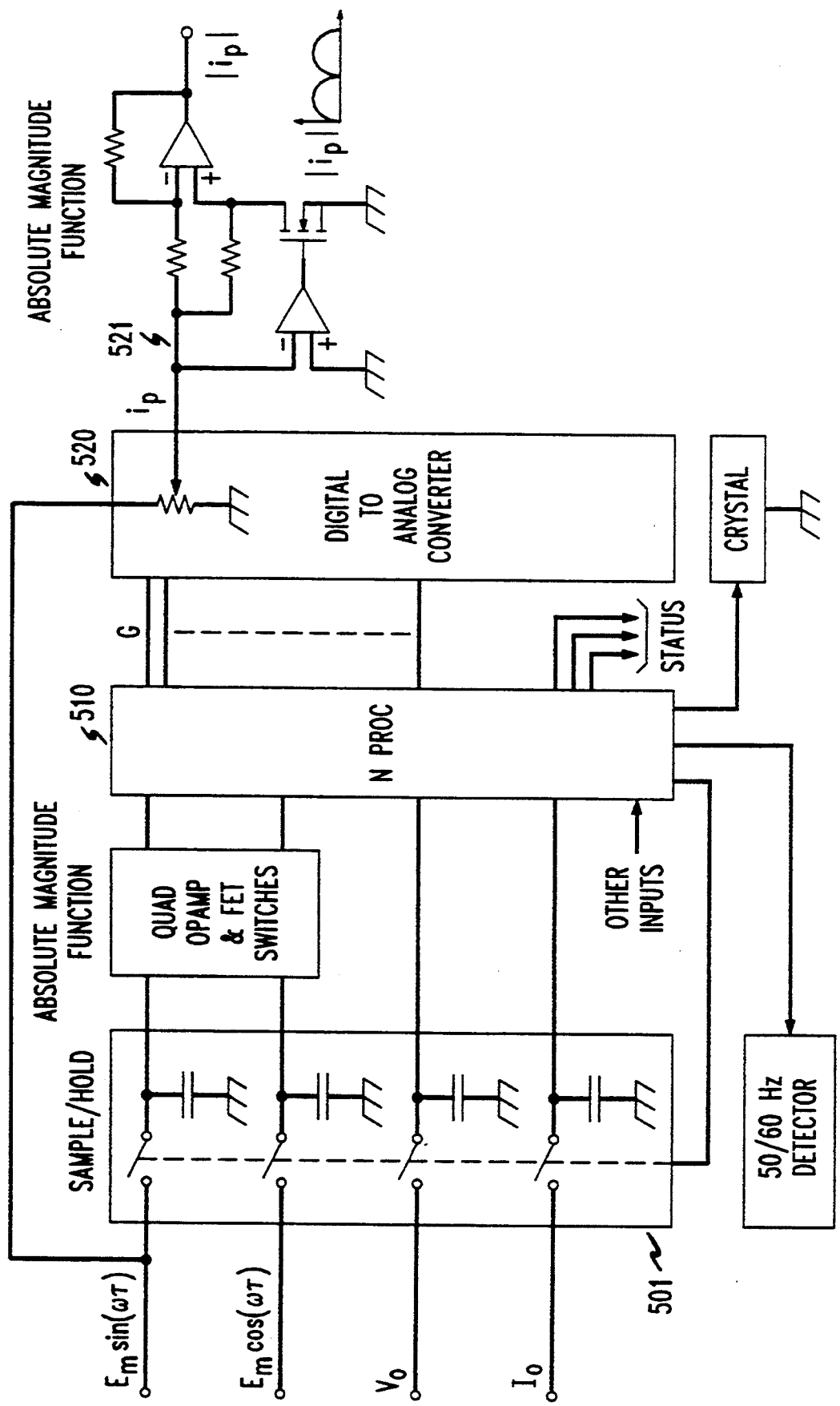
FIG. 5 is a schematic of a digital implementation of a power factor controller.

Several approaches can be used to implement a controller based on Equation 7. One method uses analog multipliers and dividers to perform the nonlinear operations such as squaring, multiplication and division, and operational amplifiers for summing and subtracting. One implementation of this method has been described above. Another approach, such as shown in the FIG. 5 implements the controller with digital technology by using a microcontroller 510 such as an 80C51-type which can include multiplexed analog-to-digital conversion on the same integrated circuit to compute the slowly varying quantities such as the controlled conductance G. Quickly varying quantities such as $i_p$ can be formed using a multiplying digital-to-analog converter (DAC) 520 such as the DAC1022. Thus, the multiplying DAC 520 conveniently multiplies a quickly varying analog signal (i.e., $E_m \cdot \sin(\omega t)$) by a slowly varying digital signal, i.e., the digital representation of the controlled conductance G, to form the quickly varying output, $i_p$ on lead 521.

The inputs $E_m \sin(\omega t)$, $E_m \cos(\omega t)$, $V_0$ and $I_0$ are applied to the sample and hold circuit 501. The sampled values are applied either directly or via operational amplifiers to form the absolute value of the signals which are applied to the microprocessor 510. The processed output of the microprocessor 510 is applied to the digital to analog converter 520 and from thence to the circuitry for deriving the absolute magnitude $i_p$.

Figure 6:
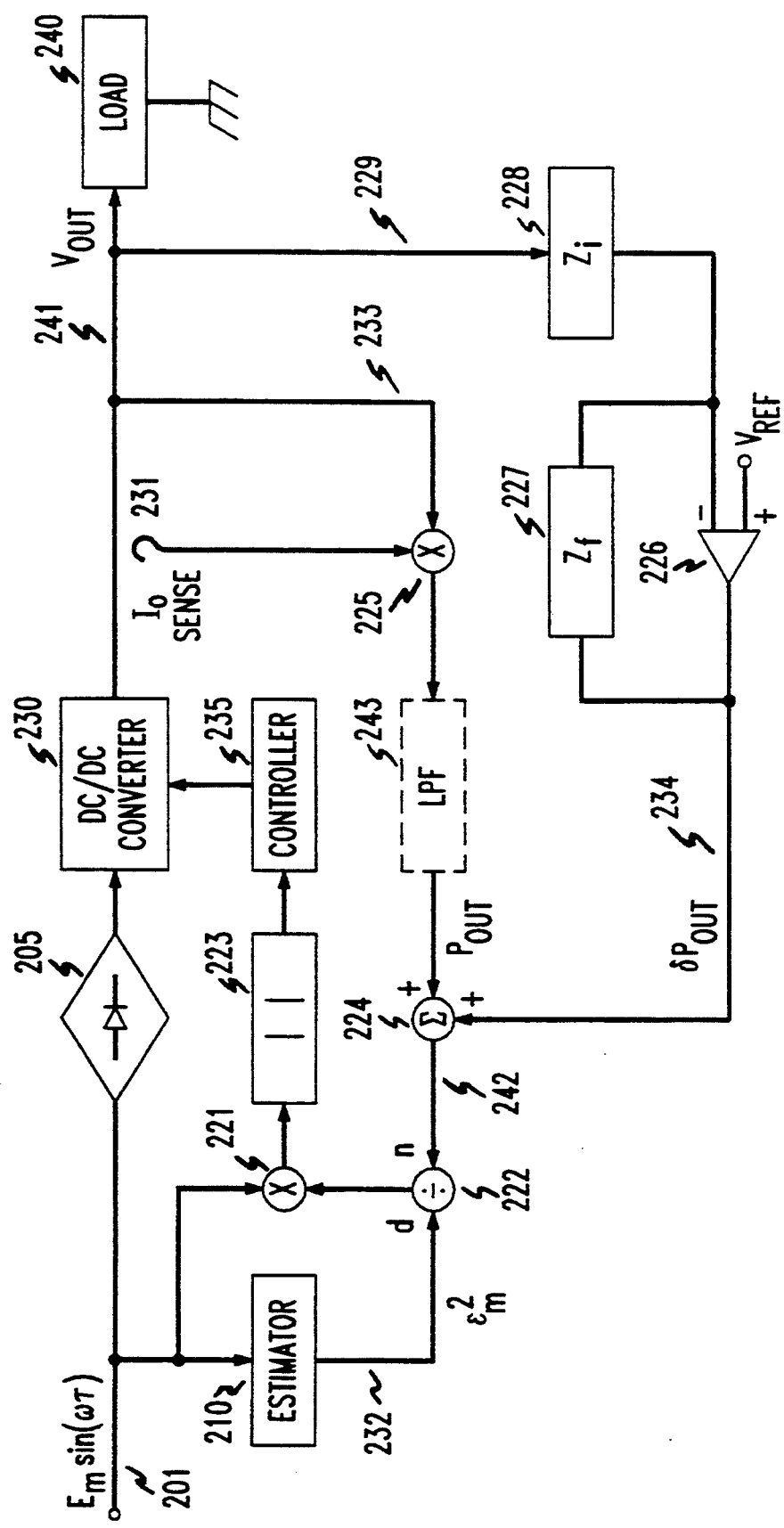
FIG. 6 is a schematic of another arrangement of a power system with enhanced power factor according to the principles of the invention.

A power factor enhancement system shown in the FIG. 6 is similar to that of the FIG. 2 system. In the system of FIG. 6 the input terminal 201 is directly connected to the multiplier 221 via lead 202. In this arrangement the waveform of the input AC voltage is assumed to be essentially free from distortion.

Figure 7:
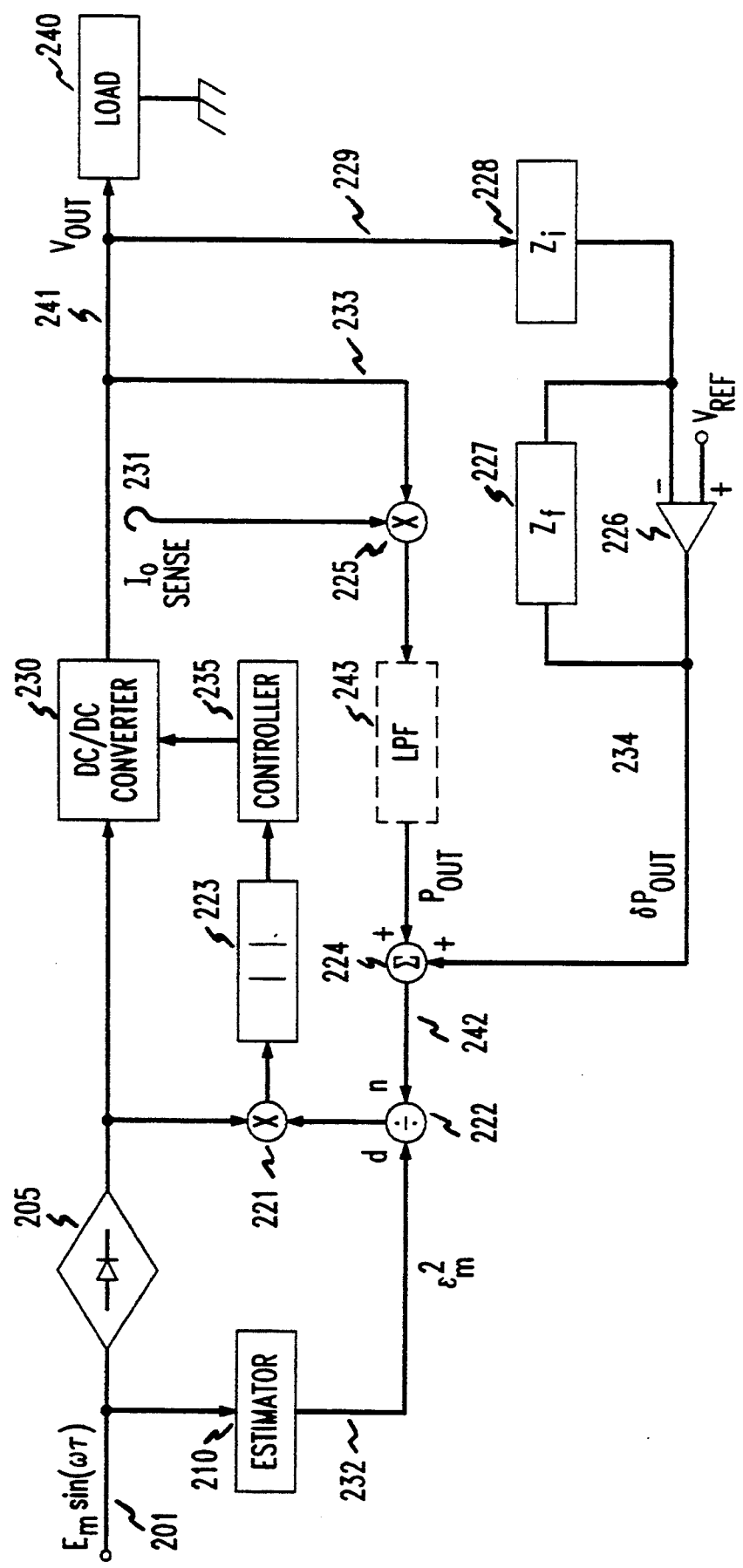
FIG. 7 is a schematic of another arrangement of a power system with enhanced power factor according to the principles of the invention.

Another variant of the power factor enhancement system is shown in the FIG. 7 in which the rectified sine wave output of the rectifier 205 is applied to the multiplier 221.

Figure 8:
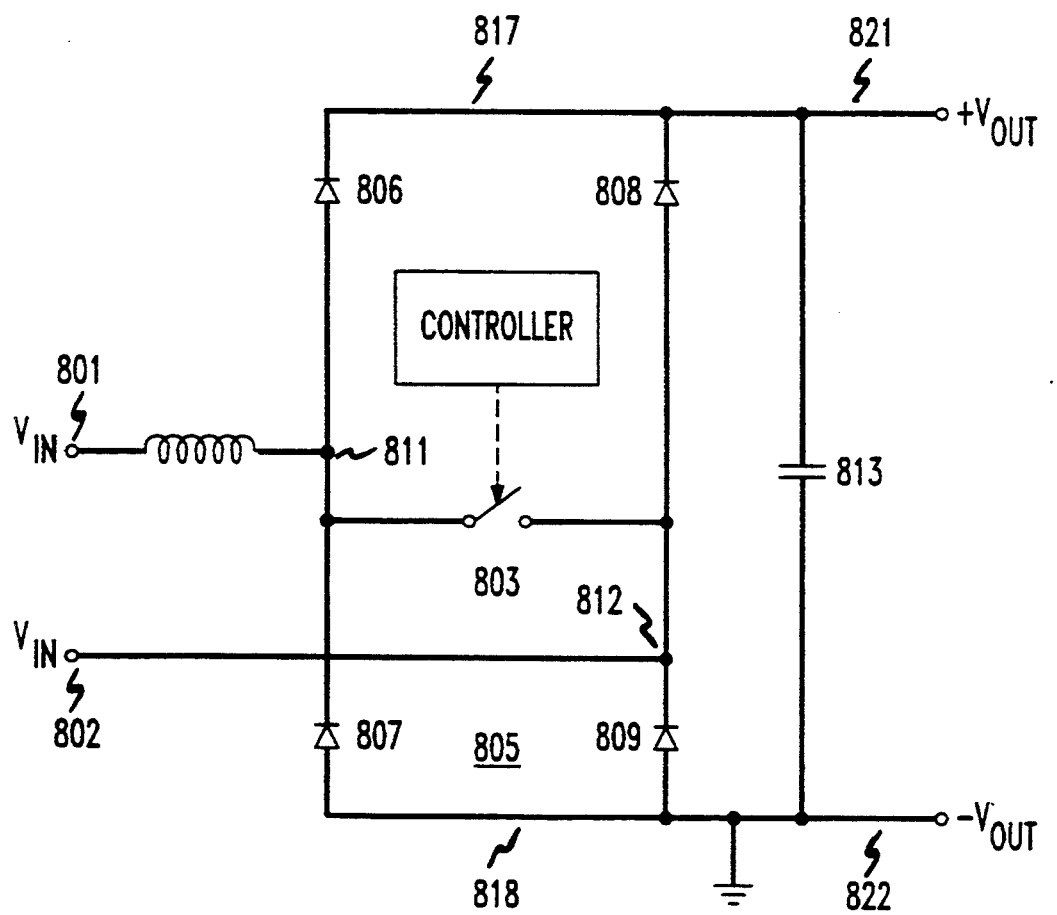
FIG. 8 is a schematic of a power processing circuit suitable for use with the power factor enhancement components and arrangements of FIGS. 1–7.

The power factor control system of the invention allows the utilization of many various configurations of the OLS. For example an OLS in which the boost converter and rectification are merged into one unitary circuit combining both functions is shown in FIG. 8. Such a circuit arrangement allows a minimization of circuit components incurring a loss as compared with a combination of a separate rectifier with a separate power converter for wave shaping as a power factor enhancing circuit. The circuit of FIG. 8 accepts an AC line voltage at the input terminals 801 and 802. This AC voltage is applied to the junction nodes 811 and 812 of a diode bridge circuit 805 which includes the diodes 806, 807, 808 and 809. A bidirectional power switch 803 selectively connects the two junction nodes 811 and 812. The output nodes 817 and 818 of the bridge are connected to the output terminals 821 and 822. A charge storage capacitor 813 shunts the output terminals 821 and 822.

The power switch 803 is driven by the output of the controller to pulse width modulate the rectified current to control the waveform of this signal and the voltage at the output terminals 821 and 822.

This arrangement may be readily substituted for the rectifier converter arrangement of the FIG. 2 with the control drive applied directly to the bidirectional power switch 803.

We claim:

1. A power factor enhancement system, comprising:
an input for accepting an AC voltage waveform $e_{in}$;
circuitry connected to the input for modulating the AC voltage waveform with a power switch and having an input to output efficiency of $\eta$;
an estimator connected to receive the AC voltage waveform at the input and generate a signal representative of a square of a peak magnitude of the AC voltage waveform $E_m^2$;
current/voltage detection means for generating a signal representative of a power output $P_{out}$ and being connected to an output of the circuitry for modulating;
voltage detection means for generating a signal representative of a power output $\delta P_{out}$ difference and being connected to an ouput of the circuitry for modulating;
a control system for deriving a value representative of a conductance G where the value G is:

$$G = \frac{2 \cdot (P_{out} + \delta P_{out})}{\eta \cdot E_m^2}$$

and generating a modulated pulse signal for driving the power switch in response to the outputs of the estimator, the current/voltage detection means and the voltage detection means to generate the programmed current $i_p$ where $i_p$ represents a desired current drawn from the input and is defined as $$i_p = G \cdot e_{in}.$$

2. A power factor enhancement system as claimed in claim 1, comprising:
the voltage detection means for generating a signal representative of a power output difference includes an operational amplifier connected to sum an output voltage with a reference voltage.

3. A power processing system connected to an AC power line including circuitry for enhancing power factor and reducing signal distortion of an AC input, comprising:
an AC input for accepting an AC line voltage;
an off line switching type voltage regulator coupled to receive a voltage signal responsive to the AC voltage at the AC input and including a power switch for controlling current flow;
a DC output of the off line switching type voltage regulator connected to a voltage storage capacitor and a load to be energized;
means for controlling the switching of the power switch, including:
an estimator, connected to the AC input for generating an estimated rms value $E_{rms}^2$ of the AC input;
a current sensor connected to sense a load current of the load in order to estimate an output power $P_{out}$;
summing means for deriving an error signal $\delta P_{out}$ representative of a difference between a DC voltage of the load versus a reference voltage;
a second summing means for summing the error signal with the estimate of output power to generate a power estimate with added increment ($P_{out} + \delta P_{out}$);

division circuitry connected to accept and divide the power estimate with added increment ($P_{out} + \delta P_{out}$) by the $E_{rms}^2$ estimated value of the AC input to produce a value representative of a conductance and power level of the off line switching type voltage regulator;

multiplying circuitry connected to receive and multiply the value representative of a conductance and power level of the off line switching type voltage regulator and a signal representing a magnitude of the input AC voltage; and means for utilizing output of the multiplying circuitry for driving the power switch to control input current to be proportional to the input voltage.

4. A power processing system connected to an AC power line as claimed in claim 3, including scaling circuitry for controlling a magnitude of the output of the multiplying circuitry.

5. A power processing system connected to an AC power line as claimed in claim 3, including circuitry, connected to an output of the estimator, for deriving an absolute magnitude of the programmed current.

6. In a power processing system connected to an AC power line having circuitry for enhancing power factor and reducing signal distortion at an AC input of the power processing system; comprising:

a rectifier connected for receiving an AC voltage at the AC input;

a switching type voltage regulator connected to receive a rectified signal provided by the rectifier and including a power switch for controlling current flow;

an output of the switching type voltage regulator connected to a voltage storage capacitor and a load to be energized;

means for controlling the switching of the power switch, including:

an estimator, connected for generating a $E_{rms}^2$ estimated substantially ripple-free value of the AC input and including means for suppressing ripple of the AC input;

a current sensor, connected to sense a load current of the load, and operative for generating a substantially ripple-free estimate of output power $P_{out}$; and including means for suppressing ripple of the load current;

summing means for deriving an error signal $\delta P_{out}$ representative of a difference between a DC voltage of the load versus a reference voltage;

a second summing means for summing the error signal with the substantially ripple free estimate of output power to generate a power estimate with added increment ($P_{out} + \delta P_{out}$);

division circuitry connected to accept and divide the power estimate with added increment ($P_{out} + \delta P_{out}$) by the $E_{rms}^2$ estimated substantially ripple-free value of the AC input to produce a value representative of a conductance of the switching type voltage regulator and a power level of the rectifier;

multiplying circuitry connected to receive and multiply an output of the division circuitry and an output of the estimator; and means for utilizing output of the multiplying circuitry for driving the power switch to control input current to be proportional to the input voltage.

7. In a power processing system as claimed in claim 6, comprising:

scaling circuitry for controlling a magnitude of the output of the multiplying circuitry.

8. In a power processing system as claimed in claim 6, comprising:

circuitry for deriving an absolute magnitude of the programmed current connected to an output of the estimator.

9. In a power processing system connected to an AC power line having circuitry for enhancing power factor and reducing signal distortion at an AC input of the power processing system; comprising:

a rectifier connected for receiving an AC voltage at the AC input;

a switching type voltage regulator connected to receive a rectified signal provided by the rectifier and including a power switch for controlling current flow;

an output of the switching type voltage regulator connected to a voltage storage capacitor and a load to be energized;

means for controlling the switching of the power switch, including:

an estimator, connected to the AC input, and operative for generating a $E_{rms}^2$ estimated substantially ripple-free value of the AC input and including means for reducing ripple of the AC input by modeling the AC input voltage as a two state-variable oscillator;

a current sensor, connected to sense a load current of the load, and operative for generating a substantially ripple-free estimate of output power $P_{out}$, and including means for suppressing ripple of the load current; by modeling the load current and voltage as a two state-variable oscillator;

summing means for deriving an error signal $\delta P_{out}$ representative of a difference between a DC voltage of the load versus a reference voltage;

a second summing means for summing the error signal with the substantially ripple free estimate of the power output $P_{out}$ to generate a power estimate with an added increment ($P_{out} + \delta P_{out}$);

division circuitry connected to accept and divide the power estimate with added increment ($P_{out} + \delta P_{out}$) by the $E_{rms}^2$ estimated value of the AC input to produce a value representative of a conductance of the switching type voltage regulator and a power level of the rectifier;

multiplying circuitry connected to receive and multiply the value representative of a conductance of the switching type voltage regulator and a power level of the rectifier and an output of the rectifier representing a magnitude of the input AC voltage; and means for utilizing output of the multiplying circuitry for driving the power switch.

* * * * *